US011544113B2

(12) United States Patent
Wang et al.

(10) Patent No.: US 11,544,113 B2
(45) Date of Patent: Jan. 3, 2023

(54) TASK SCHEDULING FOR MACHINE-LEARNING WORKLOADS

(71) Applicant: Google LLC, Mountain View, CA (US)

(72) Inventors: Jue Wang, Redmond, WA (US); Hui Huang, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 461 days.

(21) Appl. No.: 16/720,717

(22) Filed: Dec. 19, 2019

(65) Prior Publication Data

US 2021/0149729 A1     May 20, 2021

Related U.S. Application Data

(60) Provisional application No. 62/938,304, filed on Nov. 20, 2019.

(51) Int. Cl.
   *G06F 9/50* (2006.01)
   *G06N 3/04* (2006.01)
   *G06N 20/00* (2019.01)

(52) U.S. Cl.
   CPC ............. *G06F 9/5011* (2013.01); *G06N 3/04* (2013.01); *G06N 20/00* (2019.01); *G06F 2212/2542* (2013.01)

(58) Field of Classification Search
   CPC ........... G06F 9/5011; G06F 2212/2542; G06F 9/4881; G06F 9/5027; G06N 20/00; G06N 3/04; G06T 1/20

(Continued)

(56) References Cited

U.S. PATENT DOCUMENTS

| 9,697,045 B2 | 7/2017 | Amaral et al. |
| 10,176,550 B1 | 1/2019 | Baggerman |

(Continued)

FOREIGN PATENT DOCUMENTS

| EP | 3410301 | 12/2018 |
| WO | WO 2003/067480 | 8/2003 |

OTHER PUBLICATIONS

Goglin, Brice, "Managing the Topology of Heterogeneous Cluster Nodes with Hardware Locality (hwloc)", 2014, IEEE, pp. 74-81. (Year: 2014).*

(Continued)

*Primary Examiner* — Kenneth Tang
(74) *Attorney, Agent, or Firm* — Fish & Richardson P.C.

(57) ABSTRACT

Methods, systems, and apparatus, including computer programs encoded on a computer storage medium, are described for scheduling tasks of ML workloads. A system receives requests to perform the workloads and determines, based on the requests, resource requirements to perform the workloads. The system includes multiple hosts and each host includes multiple accelerators. The system determines a quantity of hosts assigned to execute tasks of the workload based on the resource requirement and the accelerators for each host. For each host in the quantity of hosts, the system generates a task specification based on a memory access topology of the host. The specification specifies the task to be executed at the host using resources of the host that include the multiple accelerators. The system provides the task specifications to the hosts and performs the workloads when each host executes assigned tasks specified in the task specifications for the host.

18 Claims, 5 Drawing Sheets

(58) Field of Classification Search
USPC .......................................................... 718/104
See application file for complete search history.

(56) References Cited

U.S. PATENT DOCUMENTS

| | | | |
|---|---|---|---|
| 11,119,942 B2* | 9/2021 | Gschwind | G06F 3/0611 |
| 2013/0185729 A1 | 7/2013 | Vasic et al. | |
| 2017/0168715 A1 | 6/2017 | Eshwarappa et al. | |
| 2019/0050265 A1 | 2/2019 | Vijayaraghavan et al. | |
| 2019/0205173 A1 | 7/2019 | Gupta et al. | |
| 2019/0266015 A1 | 8/2019 | Chandra et al. | |
| 2019/0272461 A1 | 9/2019 | Ravindranath | |
| 2019/0312772 A1* | 10/2019 | Zhao | H04L 41/12 |
| 2019/0325554 A1 | 10/2019 | Kelly | |
| 2019/0356731 A1* | 11/2019 | Bivens | H04L 41/5009 |
| 2020/0142753 A1* | 5/2020 | Harwood | G06F 9/4856 |
| 2021/0144517 A1* | 5/2021 | Guim Bernat | G06F 9/4881 |
| 2021/0149680 A1* | 5/2021 | Hughes | G06T 1/60 |

OTHER PUBLICATIONS

[No Author],"The CPU Scheduler in Vmware vSphere 5.1: Performance Study," Vmware, Feb. 2013, 26 pages.

Amaral et al., "Topology-Aware GPU Scheduling for Learning Workloads in Cloud Environments," ACM, Nov. 2017, 12 pages.

Amazon.com [online], "Linux Accelerated Computing Instances," available as early as Dec. 2016, retrieved on Dec. 19, 2019, URL <https://docs.aws.amazon.com/AWSEC2/latest/UserGuide/accelerated-computing-instances.html>, 1 page.

Microsoft.com [online], "Introducing NVv4 Azure Virtual Machines for GPU visualization workloads," Aug. 2019, retrieved on Dec. 19, 2019, URL <https://azure.microsoft.com/en-us/blog/introducing-nvv4-azure-virtual-machines-for-gpu-visualization-workloads/>, 5 pages.

Psaroudakis et al., "Adaptive NUMA-aware data placement and task scheduling for analytical workloads in main-memory collumn-stores," Proceedings of the VLDB Endowment, Oct. 2016, 10(2): 37-48.

Rao et al., "Optimizing Virtual Machine Scheduling in NUMA Multicore Systems," IEEE International Symposium on High Performance Computer Architecture, Feb. 2013, 12 pages.

Vikranth et al., "Topology Aware Task Stealing for On-Chip NUMA Multi-Core Processors," Procedia Computer Science, Jan. 2013, 18:379-388.

PCT International Search Report and Written Opinion in International Application No. PCT/US2020/049648, dated Nov. 25, 2020, 13 pages.

International Preliminary Report on Patentability in International Appln. No. PCT/US2020/049648, dated Jun. 2, 2022, 8 pages.

* cited by examiner

TASK SCHEDULING FOR MACHINE-LEARNING WORKLOADS

CROSS REFERENCE TO RELATED APPLICATION

This application claims the benefit of U.S. Provisional Application No. 62/938,304, filed on Nov. 20, 2019, which is incorporated herein by reference in its entirety.

BACKGROUND

This specification generally relates to scheduling tasks of computing workloads and allocating resources used to perform the tasks of the computing workloads.

Distributed computing systems generally include various resources such as central processing units (CPUs), storage components, and image/speech processing accelerators, video transcoding accelerators or neural network processors (e.g., machine-learning (ML) accelerators). These resources can interact to process tasks of an example computing workload, such as a workload for training a ML system or an inference workload for classifying an image or generating a transcription for speech recognition.

Existing schemes for processing workloads regularly require accessing memory and exchanging data communications between computing resources or groups of resources in a distributed system that are non-local (or remote) relative to each other. Such non-local memory access operations and data communications are often bandwidth intensive, which can lead to performance bottlenecks in a computing cluster when a host's bandwidth for cross-socket (e.g., remote) operations is limited.

SUMMARY

This document describes techniques for improved scheduling and resource allocation when processing a machine-learning (ML) workload by assigning tasks of the workload to respective groups of resources across multiple hosts in a large-scale distributed system. Using the techniques described in this document, the distributed system can be configured to assign each task of the workload to a group of resources that exchange data communications via a shared or common hardware bus of the distributed system. This assignment scheme allows for reduced workload processing time by leveraging resource locality that is based on a non-uniform memory access (NUMA) topology of the resource group. In some examples, the described techniques can be used to perform NUMA-aware scheduling for a fleet of hardware accelerators to accelerate neural network computations performed at discrete tensor processing nodes of the distributed system.

One aspect of the subject matter described in this specification can be embodied in a method for scheduling tasks and allocating resources to perform a machine-learning workload using hardware accelerators that are each configured to implement a neural network that includes multiple neural network layers. The method includes: receiving a request to perform the machine-learning (ML) workload; determining, based on the request, a resource requirement to perform the ML workload at a distributed processing system comprising a plurality of hosts, each host in the plurality of hosts comprising a respective plurality of hardware accelerators; determining, based on the resource requirement and the respective plurality of hardware accelerators for each host, a quantity of hosts that are each assigned to execute a respective task from a set of tasks that form the ML workload.

For each host in the quantity of hosts, the method includes: generating, based on a memory access topology of the host, a respective task specification that specifies the task assigned to be executed at the host using resources of the host that include the respective plurality of hardware accelerators; and providing the respective task specification to the host in the quantity of hosts; and performing the ML workload by executing, by each host in the quantity of hosts, the task specified in the respective task specification for the host.

These and other implementations can each optionally include one or more of the following features. For example, in some implementations, the memory access topology of each host comprises a respective non-uniform memory access (NUMA) topology that includes a respective memory that is local to the host; and the respective memory includes a socket interface that couples the respective memory to each hardware accelerator of the respective plurality of hardware accelerators and one or more other resources of the host.

In some implementations, executing the task specified in the respective task specification includes: performing multiple neural network computations to generate an output for each neural network layer of the plurality of neural network layers in response to assigning respective portions of the multiple neural network computations to each hardware accelerator in the respective plurality of hardware accelerators.

In some implementations, performing the ML workload includes: processing instructions for the respective task specification using each resource of a control group of the host and based on data exchanged between the respective memory, the hardware accelerator, and a respective processor that is included among the resources of the host.

In some implementations, performing the ML workload comprises: executing tasks specified in the respective task specification in response to processing the instructions based on the data being exchanged via a hardware socket that links each resource of the control group of the host, wherein the hardware socket defines a local communication bus that is shared among multiple resources managed by the host.

In some implementations, a respective NUMA topology for a first host is based in part on: i) a respective first memory in a respective configuration of resources that is local to the first host; and ii) a respective second, different memory in a respective configuration of resources that is local to a second, different host, but that is remote to the first host.

In some implementations, determining the quantity of hosts includes: obtaining a system file that describes a configuration of resources that are managed by each host of the plurality of hosts; and determining the quantity of hosts based on the configuration of resources described in the system file for each host of the plurality of hosts. In some implementations, the method includes identifying one or more sockets that couple resources of the host based on a system file that describes a mapping of NUMA sockets for each host of the plurality of hosts; and forming a control group of the host based on the one or more sockets that couple the resources of the host.

In some implementations, the method includes assigning an ML task of the task specification to the control group of the host based on one or more socket interfaces for accelerators in the control group, wherein the socket interfaces are included in the mapping of NUMA sockets described in the system file; and using the accelerators in the control group to execute the ML task as a process under the control group.

Other implementations of this and other aspects include corresponding systems, apparatus, and computer programs, configured to perform the actions of the methods, encoded on non-transitory computer-readable storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments so as to realize one or more of the following advantages. The techniques described in this document can mitigate performance bottlenecks in a system by reducing or preventing the occurrence of non-local memory access operations and data communications when hosts of the system execute tasks of a workload. Relative to prior approaches, the described techniques can be used to reduce an amount of time needed to process workloads by leveraging resource locality that is based on a non-uniform memory access (NUMA) topology of resources or groups of resources managed by each host of the system.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
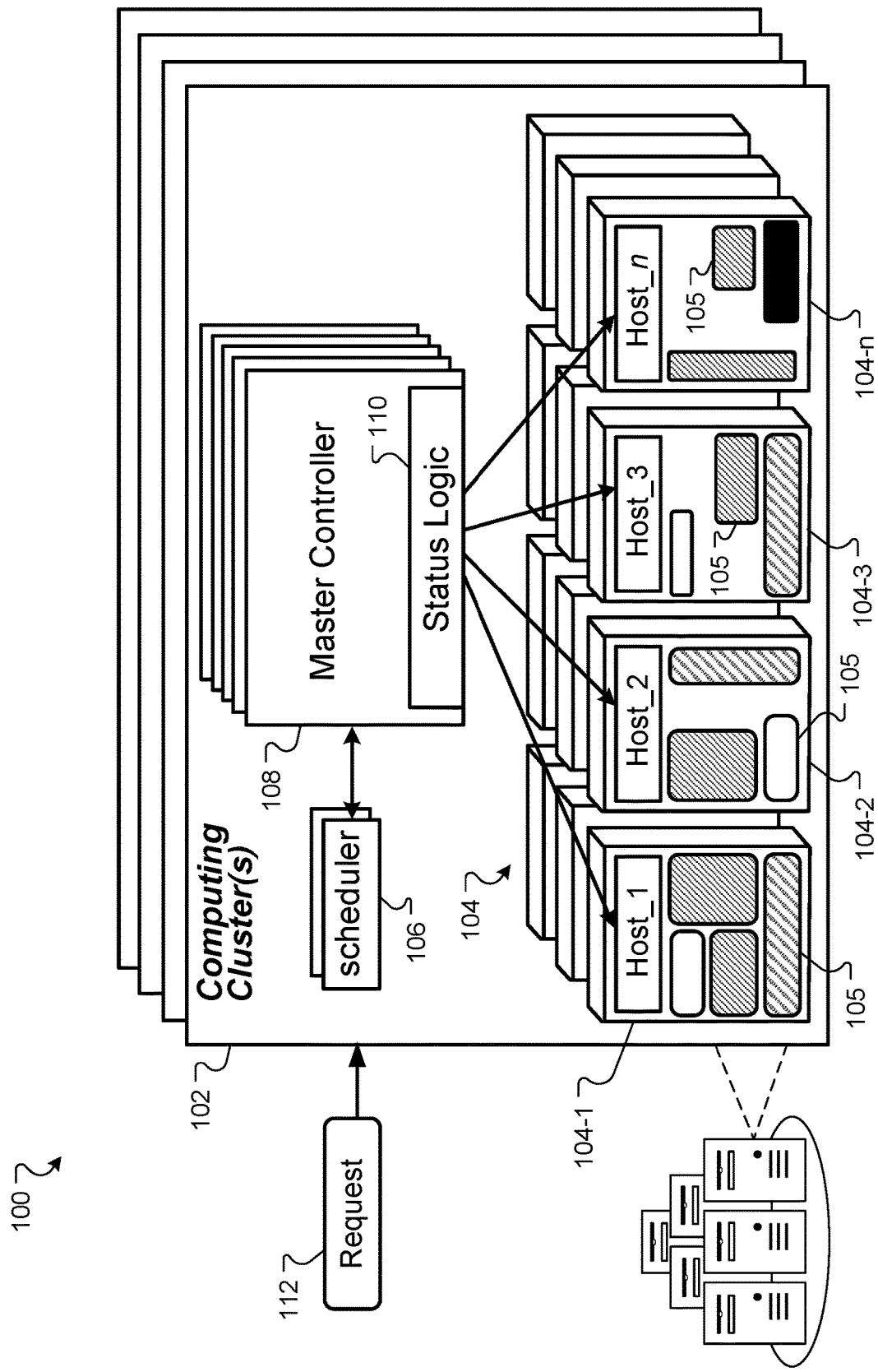
FIG. 1 is a block diagram of an example computing system for scheduling tasks that are executed to perform machine-learning workloads.

Distributed systems have multiple nodes (e.g., hosts) that include hardware devices that are used to perform a computing workload. The nodes can form individual hardware computing clusters, or host devices in a cluster, that process data to perform the workload. Each of the nodes can include multiple resources. For example, a resource may be a processor or CPU, memory, or a peripheral component interconnect (PCI) device (e.g., a hardware accelerator), and each host can include multiple resources that form a resource group. Each resource may have a certain hardware or socket connection that causes some resources to be remote, or local, relative to other resources in a node.

Approaches for processing workloads at a distributed system often require accessing memory and performing operations that include moving data between resources that are non-local (or remote) relative to each other. As noted above, such non-local memory access and data transfer operations can lead to performance bottlenecks in a cluster or host that has limited bandwidth for cross-socket (e.g., remote) operations.

In this context, techniques are described for improvements in scheduling tasks of computing workloads at computational clusters in a distributed system and allocating resources of the system that are used to perform tasks that form the computing workloads. The techniques include an improved process for assigning tasks of a workload (e.g., a ML workload) to respective groups of resources that are managed by individual hosts of a large-scale distributed system. For example, the system can be configured to assign specific tasks of the workload to a particular group of resources, where discrete resources in the group exchange data communications via a shared or common hardware bus of the distributed system. The process for assigning certain tasks to particular resource groups of a host is performed by leveraging resource locality within a computing cluster, where the locality is based on a non-uniform memory access (NUMA) topology of the resource group.

The techniques described in this specification provide an approach for performing NUMA-aware task scheduling and resource allocation across multiple hosts in distinct computing clusters of a distributed system. For example, a controller of the computing cluster can pass on a set of protocol bits that describes jobs or tasks of a workload that require NUMA locality. The techniques exploit NUMA locality of a cluster, or host within a cluster, by assigning one or more tasks to a particular set of resources or devices, such as a resource group that includes a CPU, memory, and a peripheral component interconnect (PCI) device (e.g., a hardware accelerator).

A host that manages multiple resource groups is operable to receive and process the protocol bits passed by the master controller of the cluster. For example, the host processes the protocol bits based on a determined socket topology of its resource groups and allocates a particular set of resources that are from the same NUMA socket to execute tasks for a particular job or portion of the workload as specified by the protocol bits. The described approach for NUMA-aware task scheduling and resource allocation enables a distributed system to optimize its use of NUMA locality to reduce bandwidth requirements and improve compute times for performing certain workloads.

FIG. 1 is a block diagram of an example distributed computing system 100 for scheduling tasks that are executed to perform computing workloads. System 100 can be a large-scale distributed hardware computing system that includes multiple computing clusters 102, where each cluster 102 includes multiple hosts 104 and each host 104 includes multiple computing resources 105.

One or more groups of resources can be managed by a host 104 of the distributed system 100 and each of the multiple computing clusters 102 can include multiple hosts 104. More specifically, each host 104 is configured to manage two or more discrete resources 105 that form a group of resources. A group of resources managed by a host 104 may be referred to herein alternatively as a resource group. So, in some cases the resource 105 can represent a discrete resource, such as a single processor or memory device, whereas in other cases the resource 105 can represent multiple resources, such as two or more processors, two or more memory banks, two or more hardware accelerators, or combinations of each. Resource groups of a host 104 are described in more detail below with reference to FIG. 2.

In some implementations, a host 104 is a hardware-computing device (e.g., a computer or server). In some implementations, a host 104 is a virtual machine of a distributed system (or computing cluster), a software construct for managing a group of computing resources 105, or both. The system 100 can include M number of computing clusters 102 and each computing cluster 102 of the M number of computing clusters can include N number of hosts, where each of M and N is an integer greater than or equal to one.

In some implementations, each of the computing clusters 102 includes a set of machines (e.g., hardware or virtual machines) that form the hosts 104 of the cluster 102. As shown at FIG. 1, a single cluster 102 can include multiple controllers 108 that each function to assign tasks of a workload to one or more of the hosts 104 in the cluster 102.

Each of the computing clusters 102 can include a scheduler 106 that communicates with a master controller 108 ("controller 108") of the cluster 102 as well as a link shard 110 that is accessible by the master controller 108. The controller 108 is responsible for generating task specifications and preparing instructions and commands for sending to the hosts 104, and for updating a current processing state of a host 104 based on responses from the host 104. In some implementations, each controller 108 includes status logic 110 that manages communications with subsets of hosts 104. For example, the status logic 110 is run by the controller 108 to send commands to a subset of hosts 104 to obtain information about a processing state of the host 104, and to receive responses from the hosts 104. For example, the status logic 110 is used to receive and process host reports indicating whether an assigned task is complete or in-process. The status logic 110 may determine that a task assigned to a host 104 has stalled if the host 104 fails to provide a status report after a threshold number of attempts to obtain information about the processing state of the host. In some cases, the status logic 110 is operable to aggregate and compress processing state information reported by the hosts 104 to reduce the size of update loads received at the master controller 108.

As described in more detail below, the scheduler 106 and controller 108 interact or communicate to schedule and assign tasks of a workload to a particular host 104 for execution at the host. Although depicted in FIG. 1 as being separate from the controller 108, the scheduler 106 can be integrated in the controller 108. In some implementations, the scheduler 106 is an optional processing element of the computing clusters 102 and its functions can be integrated into the assignment and control functions configured at the controller 108.

The controllers 108 are operable to assign tasks of the workload based at least on a request 112 to perform one or more workloads and a hardware configuration of resources managed by the hosts 104. For example, each of the controllers 108 can be a logically centralized controller that generates instructions based on parameters in the request 112 received at the cluster 102 and based on a hardware socket topology of resources 105 (or resource groups) included in a host 104. In some implementations, each host 104 in a subset of hosts 104 is configured as "slave" computing assets that are under a particular master controller 108. In this implementation, the master controller 108 generates instructions based on the parameters in the request 112 and the hardware socket topologies at each host 104 of the subset of hosts 104 that are "slaves" under the particular master controller 108.

A host 104 can include multiple resources 105 corresponding to machines or hardware devices, e.g., hundreds or thousands of resources or devices. Resources 105 in a host 104 can be varied or heterogeneous in many respects. For example, each group of resources 105 managed by a host 104 can vary in terms of processing devices (e.g., CPU, RAM, disk, network), processor type, processing speed, performance, and capabilities such as an external IP address or flash storage. More specifically, for each computing cluster 102, each one of the multiple hosts 104 in the cluster 102 includes one or more special-purpose hardware circuits that interact with other resources of a host to execute tasks of a workload.

For example, the special-purpose hardware circuits can be hardware accelerators, graphics processing unit (GPU) hardware accelerators, or neural network processors. In the example of FIG. 1, the system 100 can include a first host 104-1, a second host 104-2, a third host 104-3, and N number of additional hosts 104-*n*. In some implementations, the special-purpose circuits and resources 105 of first host 104-1 may differ (e.g., slightly or markedly) from the special-purpose circuits and resources 105 of a second host 104-2.

For example, the first host 104-1 may include 10 GPU hardware accelerators that are each configured to perform location-based and in-memory analytics or GPU-accelerated database queries, whereas the second host 104-2 may include 20 neural network processors that are each configured to implement a convolutional neural network (CNN) model or a recurrent neural network (RNN) model. In some implementations, the 20 neural network processors may be configured to execute binaries for trained inference models and to accelerate running a floating-point based inference model, an integer quantized inference model, or both.

The system 100 uses the controllers 108 to generate instructions for assigning and controlling the execution of individual tasks, such as tasks that can run on one or more machines of a particular host 104. The determinations for assigning certain tasks to particular resource groups of a host 104 are formed with a particular focus on leveraging resource locality within a host 104 of a computing cluster 102. The resource locality is based on a hardware topology of resource groups at a host 104 and more specifically on a non-uniform memory access (NUMA) topology of the resource group, as described below.

System 100 is configured to generate a system topology that includes hardware topologies for each computing cluster 102 and each host 104 of the computing cluster. The hardware topology is configured to identify: i) a connectivity (e.g., socket connections and interfaces) of the multiple devices and resources of a host and ii) local communication buses that enable data transfers between resources 105 of a host 104.

The system 100 is configured to identify the locations of each resource or peripheral device coupled to a connection point or component interface of a hardware socket in a host 104. For example, a host 104 can run program code (e.g., firmware) associated with a system BIOS of a hardware computer managed by the host 104 to identify the resource locations and types of resources 105 (e.g., processors and memory) coupled to a motherboard of the computer. In some implementations, an operating system of a host 104 can use a chipset of the hardware computer to obtain a detailed listing of information about data buses and peripheral devices connected at the computer managed by the host 104. For example, the listing can be based on a common portable interconnect library (e.g., libpci) representing an interconnect configuration space of an operating system running on a processor of the computer.

The controller 108 is operable to transmit outstanding instructions to each host 104 for executing a task as well as to transmit commands to each host 104 to obtain information about a current processing state of a particular machine or resource group 105 being managed at the host 104. In some implementations, the controller 108 dynamically transmits commands to obtain information about a processing state. Alternatively, the controller 108 may transmit a command to obtain information about a processing state with reference to a predetermined schedule (e.g., every few seconds), where the schedule is based on the specific task being executed at the host 104. In general, each controller 108 is operable to control the respective rates of communication between the various resources and the different resource groups of a host 104 based on the instructions and commands it transmits to the host.

Figure 2:
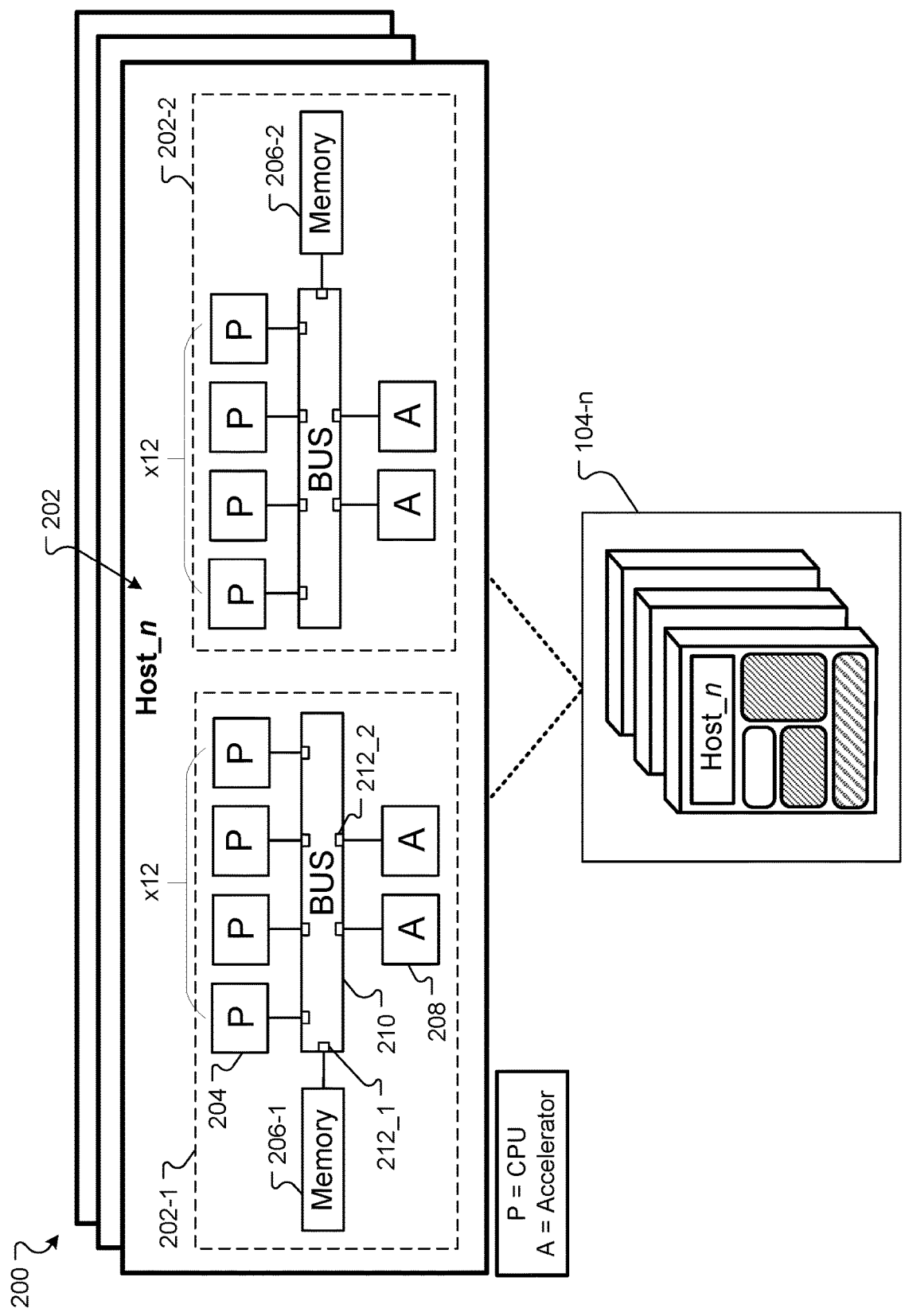
FIG. 2 shows a block diagram of example resources managed by a host included in the computing system of FIG. 1.

FIG. 2 shows a block diagram of example resource groups 200 managed by a host 104 of an example computing cluster 102. As described above, a host 104 can include hundreds or thousands of resources that correspond to machines or hardware devices. Resources 105 in a resource group of a host 104 can be varied or heterogeneous in many respects. For example, each group of resources 200 managed by a host 104 can vary in terms of processing devices (e.g., CPU, RAM, disk, network), processor type, processing speed, overall performance, and capabilities such as an external IP address or flash storage.

As shown at FIG. 2, memory access topologies of each host 104 can include a respective non-uniform memory access (NUMA) topology or socket 202-1, 202-2 of one or more resource groups 200 managed by the host 104. The NUMA topology of a resource group 200 can include multiple processors (P) 204, or multiple processor cores (P), a memory resource, e.g., random access memory (RAM), and one or more special-purpose circuits, such as a hardware accelerator 208. The individual resources of the NUMA topology can form a local NUMA node, corresponding to either NUMA socket 202-1 or 202-2.

For example, a local NUMA node may be formed based on resources in a group that exchange data communications via a shared or common hardware bus 210. Each resource in a local NUMA node may be local to another resource when the resources are connected at the node via an interface (or socket) connection to the common socket. In some implementations, each hardware accelerator 208 connects to other resources of a NUMA node via a PCI or PCI-e socket connection.

As used in this specification, NUMA relates to a computer memory design used in distributed multi-processing systems, where the memory access time depends on the memory location relative to the processor (P) 204 or processor cores. Under NUMA, a processor 204 can access its own local memory 206-1 faster than non-local memory, such as memory 206-2 that is local to another processor or memory shared between processors.

An example resource group 202 can include multiple interconnect locations 212. For example, each of interconnect locations 212-1 and 212-2 can correspond to respective component interfaces for establishing the data connections between resources 105 of a host 104, such as between a memory 206-1 of the host 104 and a hardware accelerator 208. In some implementations, resources 105 of a resource group 200 exchange data communications via a hardware socket that links local resources of a NUMA socket 202-1, wherein the hardware socket defines a local communication bus 210 that is shared among multiple resources managed by the host 104.

In some implementations, a respective NUMA topology for a first NUMA socket 202-1 is based in part on: i) a respective first memory 206-1 in a respective configuration of resources that is local to the NUMA socket 202-1 and ii) a respective second, different memory 206-2 in a respective configuration of resources that is local to a second, different NUMA socket 202-2, but that is remote to the first NUMA socket 202-1.

Figure 3:
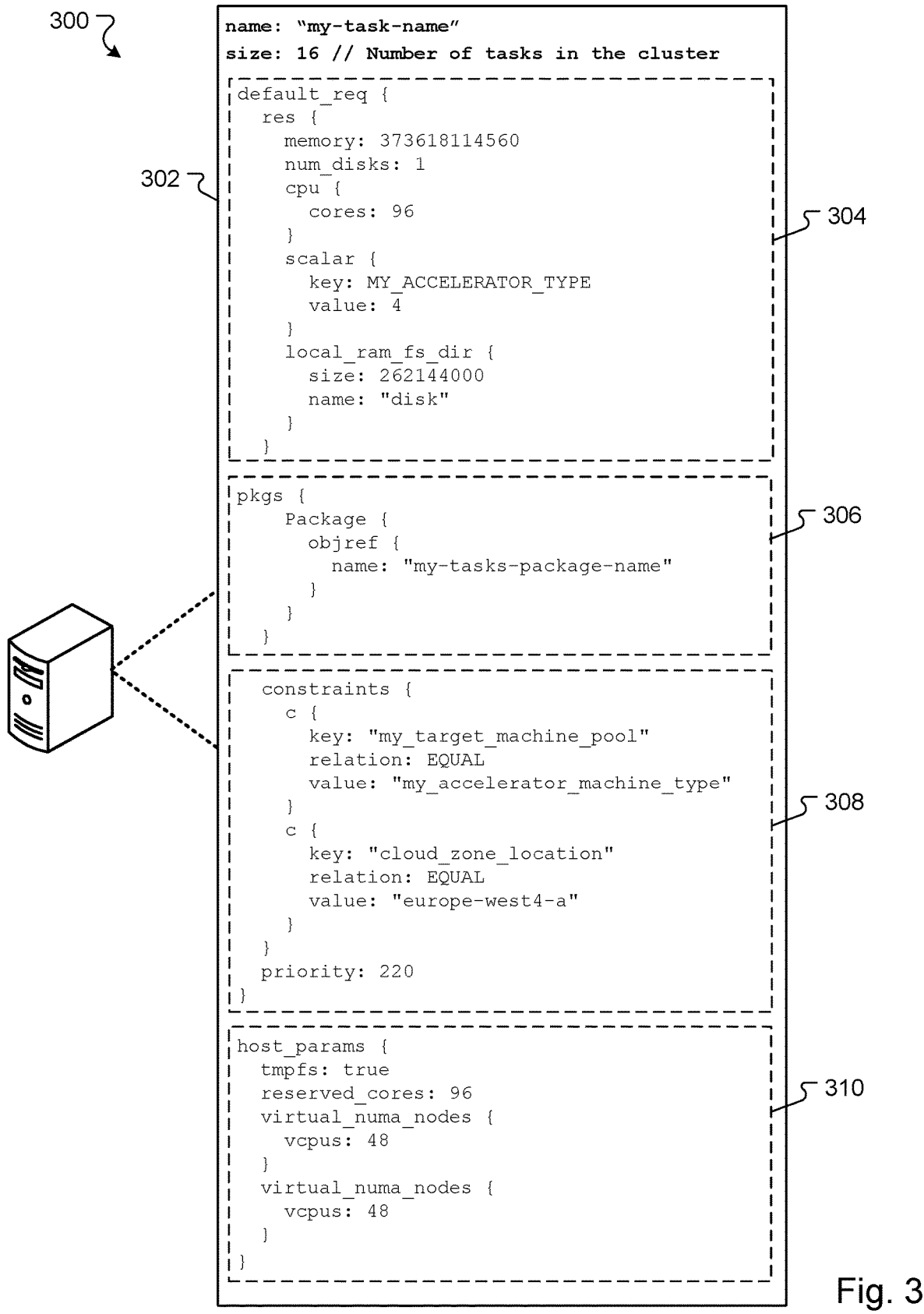
FIG. 3 shows example computing logic that can be executed to generate a task specification for performing a machine-learning workload.

FIG. 3 shows an example task specification 300 that is based on computing logic 302 executed at system 100 for performing a computing workload. As shown in FIG. 3, logic 302 can include multiple computing blocks that each include instructions (e.g., programmed code/instructions). The instructions can be executed at system 100 using processing devices of the controller 108, processing devices and other resources 105 of a host 104, or combinations of each.

Computing logic 302 can be a programmatic representation of an example task specification 300 for scheduling tasks and allocating resources to perform an ML workload at system 100. In some implementations, the ML workload is performed using hardware accelerators that are each configured to implement a neural network that includes multiple neural network layers. The instructions can be stored in one or more non-transitory machine-readable storage mediums of system 100 and are executable by one or more processors of system 100 to cause performance of operations and execute tasks of a workload.

For example, the operations can be performed to generate instructions and protocol bits (e.g., for a task specification) that are provided to a particular host 104 to execute tasks of the ML workload. In general, each host 104 is configured to run or execute one or more tasks of a workload, including tasks of multiple different workloads that may be assigned to the host 104. When a request 112 is received by a computing cluster 102 the scheduler 106 and controller 108 of the cluster 102 interact to scan the request 112.

For example, the controller 108 may scan the request 112 to identify parameters in the request 112 that specify CPU, memory, and accelerator requirements of various tasks in the workload (304). Based on the parameters and values in the request 112, the controller 108 may determine that an example workload includes 16 tasks, where each of the tasks require a total resource allocation of 96 CPUs and 4 special-purpose circuits, e.g., hardware accelerators. For example, the request 112 can include a scalar resource parameter that specifies a quantity of hardware accelerators (4) that are to be used for executing each of the 16 tasks. In some implementations, the scalar resource parameter may include a sub-type that specifies a type of hardware accelerator to be used to process the workload. For example, the sub-type may specify that each of the 4 hardware accelerators be a neural net processor configured to accelerate running a model trained for feature recognition.

A package field of the computing logic specifies a task binary for executing each of the 16 tasks (306). For example, the task binary can be a particular type of neural network or inference model that is to be executed or run at the hardware accelerator to perform computations for executing a particular task of the 16 tasks. In some cases, the task binary is derived from the scalar resource sub-type that specifies the type of hardware accelerator to be used to process tasks of the workload.

In response to identifying the parameters in the request 112, the controller 108 is operable to determine an assignment scheme for scheduling and assigning tasks to hosts 104 in the cluster 102 based on parameters of the request 112 and based on a hardware socket topology of resources 105 (or resource groups 200) in a host 104. The controller 108 generates a respective task specification based on the assignment scheme for scheduling and assigning tasks to the hosts 104. For example, each of the parameters and corresponding parameter values in the request 112 can represent a scheduling constraint for the scheduler 108. In some implementations, the request 112 may assign a priority to each of the parameters to further constraint the scheduler 108 and the controller 108. For example, priorities assigned to the accelerator sub-types or CPU cores can constraint the controller 108 to certain hosts 104 that have particular types of hardware accelerators or a particular quantity of available CPUs.

The controller 108 determines the assignment of tasks and generates the task specifications at least by analyzing the parameters of the request 112 against details of the hardware socket topology for each of the resource groups managed by one or more of the host 104 that are "slaves" under the controller 108. For example, the controller 108 is operable to scan the hardware socket topology of each resource group of a host 104 to determine a locality of the resources 105, to determine whether resources or types of resources satisfy the constraints of the request 112, and to determine an availability of the resources. In some examples, the controller 108 determines an availability of the resources from among the resources that are local to a particular NUMA node and that satisfy one or more of the constraints of the request 112. In some implementations, the hardware socket topologies for each host 104 is based on a respective memory access topology of each resource group 200 in the host 104.

In a NUMA system, there are multiple NUMA nodes that consist of a set of processors and the memory. As indicated above, the access to memory 206-1 by a processor 204 in the same NUMA node 202-1 is local, whereas processor 204 in NUMA node 202-1 accessing the memory 206-2 in another NUMA node 202-2 is remote. In some implementations, the remote access can take multiple cycles relative to local access because the remote access can involve a multi-hop operation. Due to this asymmetric memory access latency, keeping the memory access local or maximizing the memory locality can improve performance in a distributed processing. In some implementations, CPU load balancing across NUMA nodes in conjunction with exploiting NUMA locality can translate to additional performance improvements.

The master controller 108 is configured to encode one or more constraints in the task specification (308). For example, the task specification 300 can include scheduling constraints that are derived from the parameters and values in the request 112. For example, the controller 108 can translate parameters in the request 112 to task constraints that instruct the host 104 to load data used to perform computations for a task on host machines that are located within a particular cloud zone. For example, the cloud zone can be a particular physical or geographic location of a datacenter that includes a certain set of hardware accelerator resources that are required to perform the data computations for a given task of the workload.

The computing clusters 102 are configured to determine an assignment scheme for scheduling and assigning tasks to particular resource groups 200 of a host 104 in manner that leverages resource locality across multiple hosts 104 in computing cluster 102. The example task specification 300 depicted in FIG. 3 provides a simplified task specification that represents a computing cluster 102 that receives a request to execute 16 tasks. Each of the tasks occupies a host 104 that includes two NUMA nodes. In this example, each of the tasks require a total resource allocation of 96 CPUs and 4 special-purpose circuits, e.g., hardware accelerators.

That task specification 300 includes parameters that define a resource allocation of a particular host 104, such as how the host 104 is to allocate its CPU cores from a particular NUMA node (310). The example of FIG. 3 shows a balanced CPU allocation of 48 processor cores being allocated from each NUMA node to satisfy the total resource allocation of 96 CPUs for each task. In other examples, the controller 108 may generate a task specification that specifies an unbalanced allocation, such as 36 CPUs from a first NUMA node and 60 CPUs from a second NUMA node.

Figure 4:
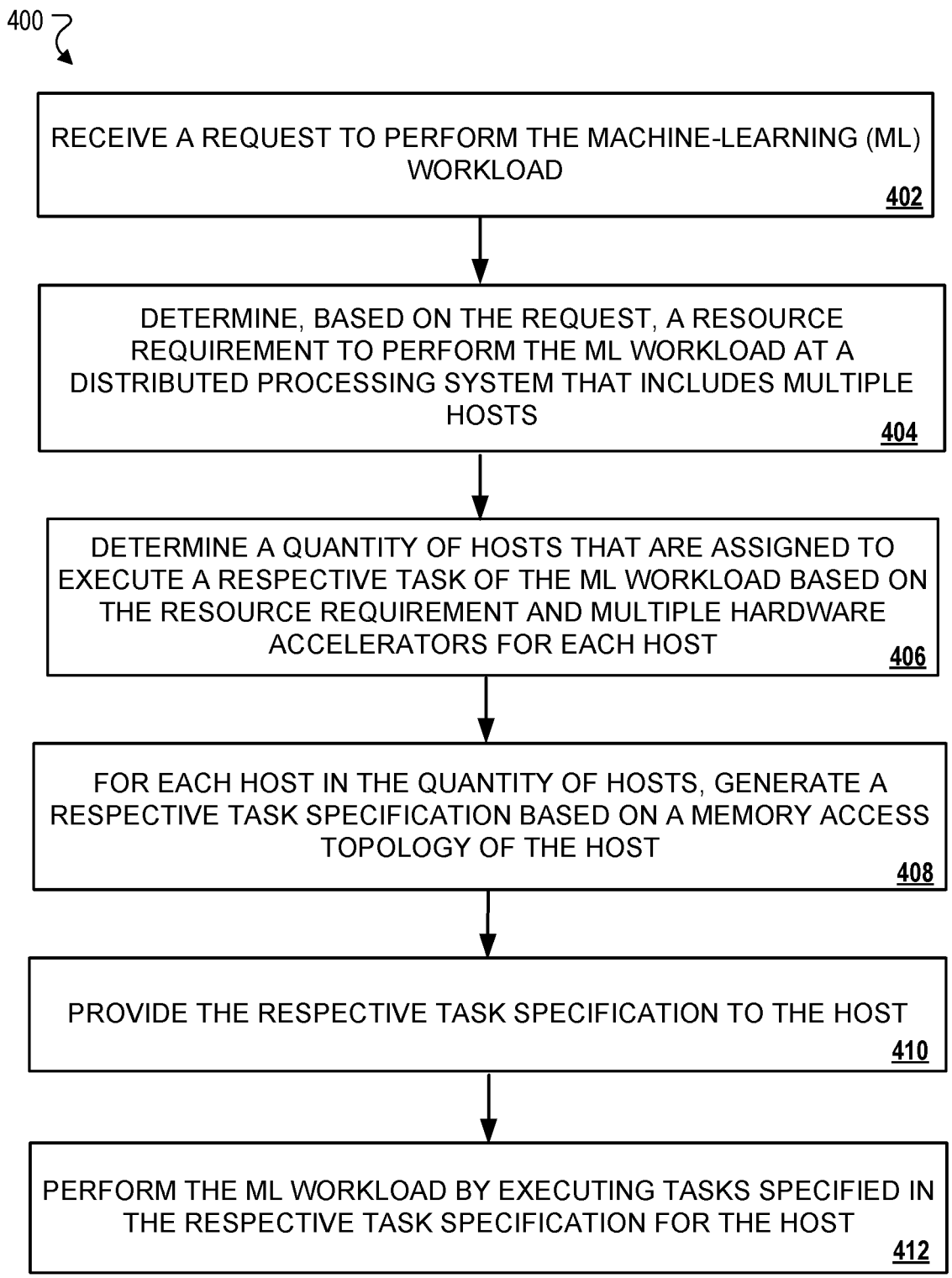
FIG. 4 shows an example process for scheduling tasks that are executed to perform machine-learning workloads.

FIG. 4 shows an example process 400 for scheduling tasks that are executed to perform machine-learning workloads. Process 400 can be implemented or executed using the system 100 described above. Hence, descriptions of process 400 may reference the above-mentioned computing resources of system 100 as well as other components described in this specification. In general, computing steps or process flows in the descriptions of process 400 can be grouped or arranged to occur in different orders and are not limited to the numerical sequence described herein.

Referring now to process 400, system 100 receives a request to perform a workload using one or more of its computing clusters (402). In some implementations, process 400 corresponds to a method for scheduling tasks and allocating resources to perform a workload using hardware accelerators and other resources of a host 104. In some examples, the workload is a training or inference workload related to a particular machine-learning operation, such as video transcoding, image processing, speech processing, autonomous vehicle navigation, or image recognition.

The request 112 can be to perform a ML workload, such as an inference workload to detect an object in an image or to recognize terms in a speech utterance. In this context, one or more of the hardware accelerators may be configured to implement a neural network that includes multiple neural network layers, such as a convolutional neural network (CNN) or a recurrent neural network (RNN). The received request 112 may include parameters that specify a particular type of neural network configuration (e.g., a CNN or RNN) that should be used to execute tasks of the workload.

The received request 112 may also be followed by a second request 112 to deploy a particular neural network on a cluster 102, for example, using a resource group of a host 104. The second request may be followed by instructions or commands to cause the controller 108 (or host 104) to obtain parameters for a set of weights for a particular neural network layer. For example, the set of weights may be obtained from memory locations of a memory managed by the host 104 based on location addresses specified in the instructions. In some implementations, the memory storing the weights obtained by the host 104 is one of multiple local resources of a NUMA node that defines a resource group at the host 104. Similarly, the instructions may cause the controller 108 (or host 104) to access other memory locations to fetch inputs for processing through the neural network layer to generate an output for the neural network layer using the local resources 105 of the NUMA node in the host 104. In some implementations, processing a particular portion of inputs identified in a request 112 through a neural network layer to generate a layer output can represent execution one or more tasks of a larger workload that may be processed across multiple hosts 104 of a computing cluster 102 or across multiple computing clusters 102.

System 100 determines a resource requirement based on the request (404). The resource requirement can indicate certain details about resources of system 100 relative to the workload request 112, such as types and amounts of computational resources that are required to perform a suite of tasks representing the ML workload. For example, the resource requirement can specify a certain processor or processor type, processing power or speed, an amount of memory or memory size, a quantity of hardware accelerators, or a measure of resource locality for resources at the distributed system.

The system 100 determines a quantity of hosts 104 that are assigned to execute a respective task of the ML workload based on the resource requirement and multiple hardware accelerators for each host (406). For each host 104 in the quantity of hosts 104, the system 100 generates a respective task specification based on a memory access topology of the host (408). The memory access topology of the host can be based on one of multiple respective NUMA topologies for each resource group 200 of the host 104. In some implementations, a particular NUMA topology of a resource group 200 is specific to a local NUMA node and includes a respective memory (M) that is local to other resources of the group. The respective memory (M) can include a socket interface that couples the memory locally to at least one hardware accelerator and one or more other resources of the NUMA node.

The controller 108 generates the task specification in response to scanning parameters of the request 112 and cross-referencing a respective hardware topology for each resource group 200 in a set of hosts 104 that are assigned as slave assets to the controller 108. The system 100 provides the respective task specification to the host (410). For example, the controller 108 can provide multiple respective task specifications to different hosts 104 and the system 100 performs the ML workload by executing tasks specified in the respective task specification for each of the hosts (412).

Figure 5:
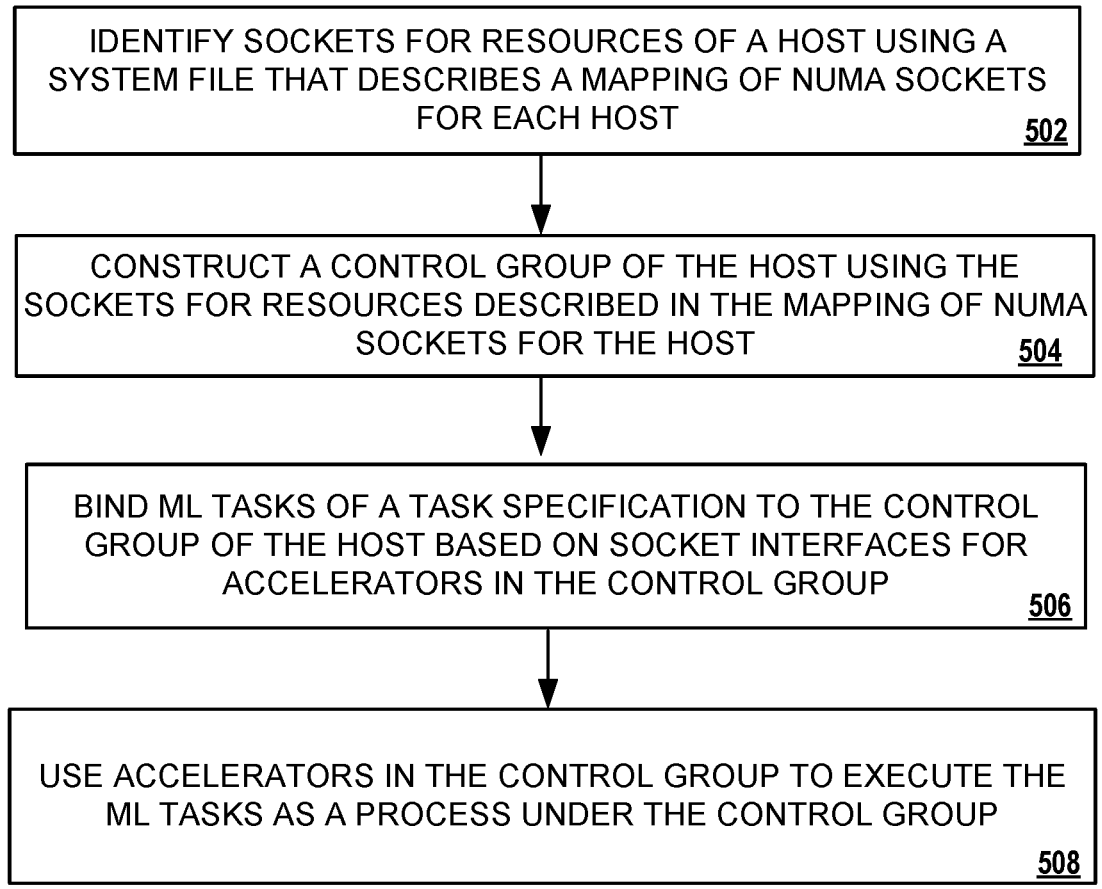
FIG. 5 shows an example process for generating a task specification that is provided to a host of the computing system of FIG. 1.

FIG. 5 shows an example process for generating a task specification that is provided to a host of the system 100. Much like process 400, process 500 can be implemented or executed using the system 100 and descriptions of process 500 may reference resources of system 100, including other components described in this specification. In general, computing steps or process flows in the descriptions of process 500 can be grouped or arranged to occur in different orders and are not limited to the numerical sequence described herein.

Referring now to process 500, system 100 is configured to identify one or more sockets for resources of a host using a system file that describes a mapping of NUMA sockets for each host (502). For example, the controller 108 is configured to determine the mapping of NUMA sockets based on a hardware topology of resource groups at the host 104. The mapping of NUMA sockets is used to indicate a NUMA topology of each of the resource groups managed by the host 104.

The controller 108 constructs a control group of the host 104 using the sockets for resources described in the mapping of NUMA sockets for the host (504). In some implementations, the controller 108 passes one or more protocol bits to a host 104 and a scheduler of the host uses the protocol bits (e.g., of a task specification) to construct the control group based on a locality of resources 105 among the various resource groups at the host 104. For example, the controller 108, or a scheduler of the host 104, is operable to construct the control group based on a NUMA topology of each of the resource groups and the types of resources at the host 104 that satisfy some (or all) of the constraints in a received request 112.

The controller 108 cooperates with the host 104 to bind or assign ML tasks of a task specification to the control group constructed at the host 104. In some implementations, the protocol bits passed by the controller 108 to the host 104 are used by a scheduler of the host 104 to bind or assign ML tasks of a task specification to the control group constructed at the host 104. The protocol bits may be included in a task specification to indicate one or more constraints or requirements of the task specification. In some implementations, the protocol bits may be associated with the task specification but provided separate from the task specification.

The host 104 is operable to bind ML tasks of a task specification to the control group based at least on socket interfaces for the particular types of accelerators in the control group, including an availability of resources in the control group (506). The host 104 uses memory resources and accelerators in the control group to execute the ML tasks of the task specification as a process under the control group (508).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus.

Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output(s). The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for scheduling tasks and allocating resources to perform a machine-learning workload using hardware accelerators that are each configured to implement a neural network comprising a plurality of neural network layers, the method comprising:
   receiving a request to perform the machine-learning (ML) workload;
   determining, based on the request, a resource requirement to perform the ML workload at a distributed processing system comprising a plurality of hosts, each host in the plurality of hosts comprising a respective plurality of hardware accelerators;
   determining, based on the resource requirement and the respective plurality of hardware accelerators for each host, a quantity of hosts that are each assigned to execute a respective task from a set of tasks that form the ML workload;
   for each host in the quantity of hosts:
      identifying one or more sockets that couple resources of the host based on a system file that describes a mapping of non-uniform memory access (NUMA) sockets for each host of the plurality of hosts;
      forming a control group of the host based on the one or more sockets that couple the resources of the host;
      generating, based on a memory access topology of the host, a respective task specification that specifies the task assigned to be executed at the host using resources of the host that include the respective plurality of hardware accelerators; and
      providing the respective task specification to the host in the quantity of hosts; and
   performing the ML workload by executing, by each host in the quantity of hosts, the task specified in the respective task specification for the host.

2. The method of claim 1, wherein:
   the memory access topology of each host comprises a respective NUMA topology that includes a respective memory that is local to the host; and
   the respective memory includes a socket interface that couples the respective memory to each hardware accelerator of the respective plurality of hardware accelerators and one or more other resources of the host.

3. The method of claim 2, wherein executing the task specified in the respective task specification comprises:
   performing multiple neural network computations to generate an output for each neural network layer of the plurality of neural network layers in response to assigning respective portions of the multiple neural network computations to each hardware accelerator in the respective plurality of hardware accelerators.

4. The method of claim 2, wherein performing the ML workload comprises:
   processing instructions for the respective task specification using each resource of a control group of the host and based on data exchanged between the respective memory, the hardware accelerator, and a respective processor that is included among the resources of the host.

5. The method of claim 4, wherein performing the ML workload comprises:
   executing tasks specified in the respective task specification in response to processing the instructions based on the data being exchanged via a hardware socket that links each resource of the control group of the host, wherein the hardware socket defines a local communication bus that is shared among multiple resources managed by the host.

6. The method of claim 4, wherein a respective NUMA topology for a first host is based in part on:
   i) a respective first memory in a respective configuration of resources that is local to the first host; and
   ii) a respective second, different memory in a respective configuration of resources that is local to a second, different host, but that is remote to the first host.

7. The method of claim 2, wherein determining the quantity of hosts comprises:
   obtaining a system file that describes a configuration of resources that are managed by each host of the plurality of hosts; and determining the quantity of hosts based on the configuration of resources described in the system file for each host of the plurality of hosts.

8. The method of claim 1, comprising:
assigning an ML task of the task specification to the control group of the host based on one or more socket interfaces for accelerators in the control group, wherein the socket interfaces are included in the mapping of NUMA sockets described in the system file; and
using the accelerators in the control group to execute the ML task as a process under the control group.

9. A system configured to schedule tasks and allocate resources for performing a machine-learning workload using hardware accelerators that are each configured to implement a neural network comprising a plurality of neural network layers comprising:
one or more processing devices; and
one or more non-transitory machine-readable storage devices storing instructions that are executable by the one or more processing devices to cause performance of operations comprising:
receiving a request to perform the machine-learning (ML) workload;
determining, based on the request, a resource requirement to perform the ML workload at a distributed processing system comprising a plurality of hosts, each host in the plurality of hosts comprising a respective plurality of hardware accelerators;
determining, based on the resource requirement and the respective plurality of hardware accelerators for each host, a quantity of hosts that are each assigned to execute a respective task from a set of tasks that form the ML workload;
for each host in the quantity of hosts:
identifying one or more sockets that couple resources of the host based on a system file that describes a mapping of non-uniform memory access (NUMA) sockets for each host of the plurality of hosts;
forming a control group of the host based on the one or more sockets that couple the resources of the host;
generating, based on a memory access topology of the host, a respective task specification that specifies the task assigned to be executed at the host using resources of the host that include the respective plurality of hardware accelerators; and
providing the respective task specification to the host in the quantity of hosts; and
performing the ML workload by executing, by each host in the quantity of hosts, the task specified in the respective task specification for the host.

10. The system of claim 9, wherein:
the memory access topology of each host comprises a respective non-uniform memory access (NUMA) topology that includes a respective memory that is local to the host; and
the respective memory includes a socket interface that couples the respective memory to each hardware accelerator of the respective plurality of hardware accelerators and one or more other resources of the host.

11. The system of claim 10, wherein executing the task specified in the respective task specification comprises:
performing multiple neural network computations to generate an output for each neural network layer of the plurality of neural network layers in response to assigning respective portions of the multiple neural network computations to each hardware accelerator in the respective plurality of hardware accelerators.

12. The system of claim 10, wherein performing the ML workload comprises:
processing instructions for the respective task specification using each resource of the host and based on data exchanged between the respective memory, the hardware accelerator, and a respective processor that is included among the resources of the host.

13. The system of claim 12, wherein performing the ML workload comprises:
executing tasks specified in the respective task specification in response to processing the instructions based on the data being exchanged via a hardware socket that links each resource of the host, wherein the hardware socket defines a local communication bus that is shared among multiple resources managed by the host.

14. The system of claim 12, wherein a respective NUMA topology for a first host is based in part on:
i) a respective first memory in a respective configuration of resources that is local to the first host; and
ii) a respective second, different memory in a respective configuration of resources that is local to a second, different host, but that is remote to the first host.

15. The system of claim 10, wherein determining the quantity of hosts comprises:
obtaining a system file that describes a configuration of resources that are managed by each host of the plurality of hosts; and
determining the quantity of hosts based on the configuration of resources described in the system file for each host of the plurality of hosts.

16. The system of claim 9, comprising:
assigning an ML task of the task specification to the control group of the host based on one or more socket interfaces for accelerators in the control group, wherein the socket interfaces are included in the mapping of NUMA sockets described in the system file; and
using the accelerators in the control group to execute the ML task as a process under the control group.

17. A non-transitory machine-readable storage medium storing instructions for scheduling tasks and allocating resources to perform a machine-learning workload using hardware accelerators that are each configured to implement a neural network comprising a plurality of neural network layers, the instructions being executable by one or more processors to cause performance of operations comprising:
receiving a request to perform the machine-learning (ML) workload;
determining, based on the request, a resource requirement to perform the ML workload at a distributed processing system comprising a plurality of hosts, each host in the plurality of hosts comprising a respective plurality of hardware accelerators;
determining, based on the resource requirement and the respective plurality of hardware accelerators for each host, a quantity of hosts that are each assigned to execute a respective task from a set of tasks that form the ML workload;
for each host in the quantity of hosts:
identifying one or more sockets that couple resources of the host based on a system file that describes a mapping of non-uniform memory access (NUMA) sockets for each host of the plurality of hosts;
forming a control group of the host based on the one or more sockets that couple the resources of the host;

generating, based on a memory access topology of the host, a respective task specification that specifies the task assigned to be executed at the host using resources of the host that include the respective plurality of hardware accelerators; and providing the respective task specification to the host in the quantity of hosts; and performing the ML workload by executing, by each host in the quantity of hosts, the task specified in the respective task specification for the host.

18. The machine-readable storage medium of claim 17, wherein:

the memory access topology of each host comprises a respective non-uniform memory access (NUMA) topology that includes a respective memory that is local to the host; and the respective memory includes a socket interface that couples the respective memory to each hardware accelerator of the respective plurality of hardware accelerators and one or more other resources of the host.

* * * * *